United States Patent [19]

Harada et al.

[11] Patent Number: 4,563,900

[45] Date of Patent: Jan. 14, 1986

[54] ACOUSTIC MICROSCOPE

[75] Inventors: Kunio Harada, Hachioji; Sumio Yamaguchi, Nishitama; Hiroshi Kanda, Tokorozawa; Isao Ishikawa, Hino; Yuzuru Ohji, Hachioji, all of Japan

[73] Assignee: Hitachi, Ltd., Tokyo, Japan

[21] Appl. No.: 603,937

[22] Filed: Apr. 26, 1984

[30] Foreign Application Priority Data

Apr. 27, 1983 [JP] Japan .................................. 58-72897

[51] Int. Cl.$^4$ ............................................. G01N 29/04

[52] U.S. Cl. ......................................... 73/644; 73/606

[58] Field of Search .......................... 73/644, 606, 607; 310/335

[56] References Cited

FOREIGN PATENT DOCUMENTS 0005648 1/1983 Japan ..................................... 73/606

OTHER PUBLICATIONS

T. S. Tan et al., "Instrumentation for Acoustical Discrimination of Biological Cells", 1976 Ultra. Symp. Proceedings, IEEE Cat. #76 CH1120-55U, pp. 80-84, Oct. 1976.

*Primary Examiner*—Stephen A. Kreitman
*Attorney, Agent, or Firm*—Antonelli, Terry & Wands

[57] ABSTRACT

In an acoustic microscope wherein an acoustic wave is projected to a predetermined specimen by an acoustic lens, and a disturbed acoustic wave from the specimen is imaged; an acoustic microscope characterized in that the lens has a ring which is arranged around it, whereby a liquid to serve as an acoustic propagation medium is held between the ring and the specimen by capillarity.

4 Claims, 3 Drawing Figures

AIR SOURCE 17
TANK 14
18
15
16
VACUUM PUMP
13
10
11
12
5
8
2
10'

ACOUSTIC MICROSCOPE

BACKGROUND OF THE INVENTION

1. Field of the Invention

The present invention relates to acoustic microscopes, and more particularly to an acoustic microscope which includes means for holding an acoustic propagation medium.

2. Description of the Prior Art

First, the operating principle of an acoustic microscope will be briefly explained with reference to FIG. 1. An electric signal is produced by a pulse generator 1. The electric signal is converted into an ultrasonic wave 4 by a piezoelectric film 3 which is disposed on the upper surface of a spherical lens 2. The ultrasonic wave 4 is propagated within the spherical lens 2 and is directed by a spherical portion 2' so as to be focused on a specimen 5. The ultrasonic wave having impinged on the specimen 5 is reflected by the surface and interior of the specimen, to become an ultrasonic echo having information relating to the specimen. Tracing the same path reversely, the echo reaches the piezoelectric film 3 and is converted into an electric signal. In order to send this signal to a monitor 6 through a receiver 19 and to form a two-dimensional picture on the monitor 6, the specimen 5 on a specimen holder 20 is scanned at high speed and little by little in the horizontal direction by movement of X- and Y-stages 7, 7' while the above operations are being repeated. On this occasion, a medium 8 functions to efficiently propagate the ultrasonic wave between the spherical lens 2 and the specimen 5 without allowing it to get out.

As illustrated in FIGS. 1 and 2, the medium (for example, water) 8 in the prior-art acoustic microscope has been held between the lens 2 and the specimen 5 by surface tension. The water has been supplied by hand employing a syringe 9 as shown in FIG. 2, and has been drained by blowing it away with air. These methods have the following disadvantages:

1. In relation to the principle of the acoustic microscope, when the specimen 5 is scanned, the water 8 is sometimes sprung out to cause a deficiency of the water.

In the case of observing the specimen with the acoustic microscope, the scanning width of the specimen is greater and the relative speed of movement between the specimen 5 and the spherical lens 2 is higher when a larger area is observed at a lower magnification. The deficiency of the water is prone to occur at such time.

2. Since the water is supplied by hand, the specimen 5 might be damaged by the tip of the needle 9' of the syringe 9.

3. The water 8 blown away by the air during the drainage scatters to stain the specimen and the surrounding mechanism portions.

4. The supply and drainage of the water attendant upon the exchange of the specimen 5 or upon the movement of the specimen 5 for changing the place thereof to be observed are troublesome.

SUMMARY OF THE INVENTION

An object of the present invention is to provide an acoustic microscope in which a liquid (for example, water) serving as an acoustic propagation medium indispensable to the acoustic microscope is stably held, and the supply and drainage of the liquid are facilitated.

The present invention for accomplishing such object is characterized in that a holding force based on capillarity is applied to the surface tension between a specimen and a spherical lens.

DETAILED DESCRIPTION OF THE PREFERRED EMBODIMENTS

Figure 1:
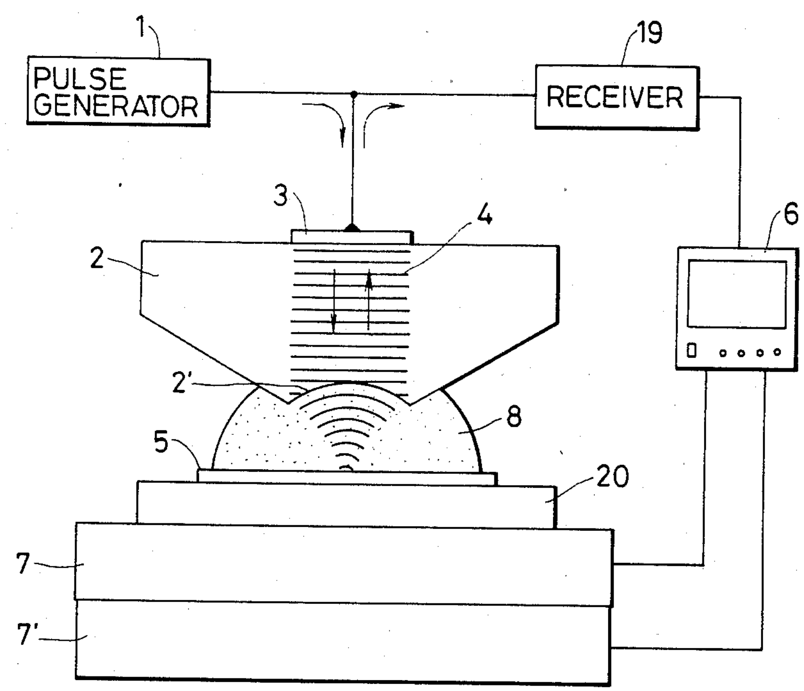
FIG. 1 is a view for explaining the principle of an acoustic microscope.
Figure 2:
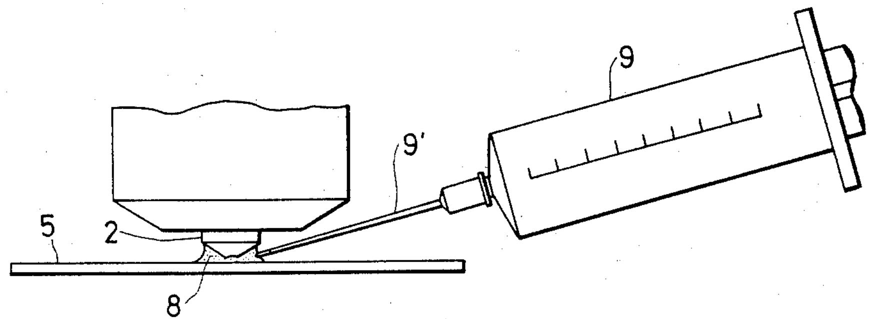
FIG. 2 is a setup view of the essential portions of a prior-art acoustic microscope.

Now, an embodiment of the present invention will be described in detail with reference to the drawing.

Figure 3:
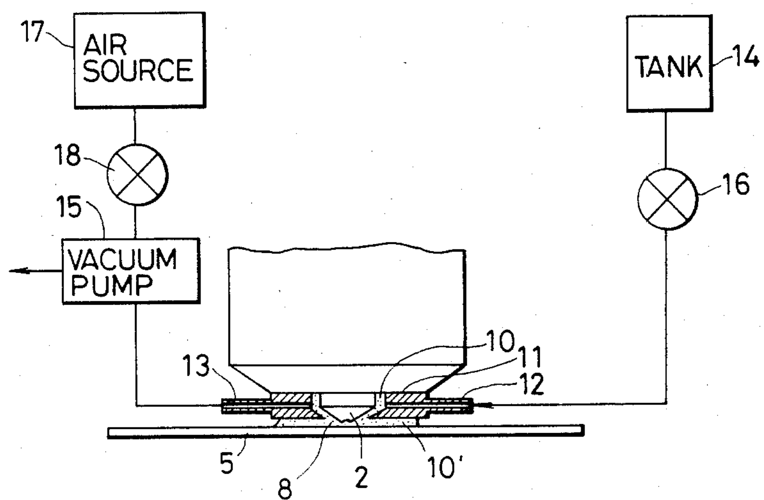
FIG. 3 is a vertical sectional view of an embodiment of the essential portions of an acoustic microscope according to the present invention.

FIG. 3 shows one embodiment of the essential portions of an acoustic microscope according to the present invention.

A ring 11 made of, e.g., stainless steel is arranged around a spherical lens 2 in order to provide a slight clearance 10. The ring 11 has a port for supply 12 and a port for drainage 13, which are respectively connected to a tank 14 containing water to be supplied and being under a slight pressure and a vacuum pump 15. In addition, the ring 11 has such a geometry that a slight clearance 10' is formed between it and a specimen 5. The water 8 percolates by capillarity into the clearance 10 between the spherical lens 2 and the ring 11 and the clearance 10' between the ring 11 and the specimen 5, and it is stably held therein.

The water is automatically supplied and drained as described below. In case of supplying the water, when a magnetic valve 16 arranged between the tank 14 and the supply port 12 is opened, the pressure in the tank 14 and the capillarity act efficiently, and an appropriate quantity of the water can be readily supplied. On the other hand, in case of draining the water, when the vacuum pump 15 connected to the drain port 13 is fed with compressed air from an air source 17 by opening a magnetic valve 18, the water in the clearance 10, 10' can be cleanly drawn by vacuum.

As described above, according to the present invention, the medium can be efficiently held, supplied and drained. Therefore, the following various effects are brought forth:

1. Since the water can be stably held by capillarity, the specimen can be continuously observed without the deficiency of the water.

2. Since the water need not be supplied and drained by hand labor in contrast to the prior art, it is not feared to flaw the specimen.

3. Since the water can be easily drained under suction by the vacuum pump, it does not scatter and does not stain the specimen or the surrounding mechanism portions.

4. The water can be readily supplied and drained. Therefore, in case of observing a chip on a wafer, or the like, the water can be automatically supplied and drained in conformity with the automatic step feed of the specimen.

5. The medium can be stably held. Therefore, even in case of using a volatile medium such as alcohol, the specimen can be stably observed for a long time.

While the foregoing embodiment has mentioned the example of transmitting and receiving the waves with the single acoustic lens, the respective waves may well be transmitted and received by individual acoustic lenses. In this case, either of the supply port and the drain port is provided.

While, in the embodiment, the ring has been used for holding the medium, it is not restrictive but any means capable of holding the medium through the action of capillarity may be used.

We claim:

1. An acoustic microscope comprising:

means including an acoustic lens for projecting an acoustic wave onto a specimen and for receiving acoustic waves reflected from said specimen via said acoustic lens;

a specimen holder for supporting a specimen adjacent said acoustic lens;

scanning means for moving said acoustic lens and said specimen holder relative to each other to cause a scanning of said acoustic wave on said specimen; and a ring-shaped member disposed between said acoustic wave projecting means and said specimen holder and having an annular space through which said acoustic lens projects so that a slight clearance space is formed between said acoustic lens and said ring-shaped member in which a fluid acoustic propagation medium is held by capillary action.

2. An acoustic microscope according to claim 1, wherein said ring-shaped member has a supply channel therein communicating with said annular space, and further including means for supplying fluid acoustic propogation medium to said supply channel so that said medium fills said slight clearance space by capillary action.

3. An acoustic microscope according to claim 1, wherein said ring-shaped member has a discharge channel therein communicating with said annular space, and further including means for draining fluid acoustic propogation medium from said annular space via said discharge channel.

4. An acoustic microscope according to claim 1, wherein said ring-shaped member has a significant thickness so that said annular space accommodates a substantial portion of the length of said acoustic lens.

* * * * *